Patented May 26, 1925.

1,539,347

UNITED STATES PATENT OFFICE.

MELCHIOR BOENIGER, OF BASEL, SWITZERLAND, ASSIGNOR TO SOCIETY CHEMICAL WORKS FORMERLY SANDOZ, OF BASEL, SWITZERLAND.

AZO DYES OF THE PYRAZOLONE SERIES AND PROCESS OF MAKING SAME.

No Drawing. Application filed February 4, 1925. Serial No. 6,896.

*To all whom it may concern:*

Be it known that I, MELCHIOR BOENIGER, a citizen of the Swiss Republic, and resident of Basel, Switzerland, have invented new and useful Azo Dyes of the Pyrazolone Series and Processes of Making Same, of which the following is a full, clear, and exact specification.

The present invention relates to the manufacture of new and valuable azo dyes of the pyrazolone series by combining the 1.2'.-5'-dichloro-3'-sulfophenyl-3-methyl-5-pyrazolone corresponding to the constitution

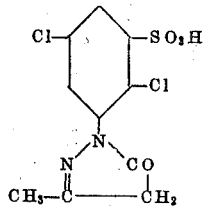

with diazo compounds.

The new pyrazolone used in this process derives from the hitherto unknown paradichlorometanilic acid, which can be obtained by sulfonation of paradichlorobenzene and subsequent nitration and reduction. By condensing the corresponding paradichlorophenylhydrazinemetasulfonic acid

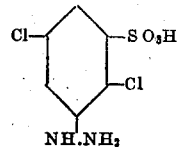

with ethyl-aceto-acetate the new 1.2'.5'-dichloro-3'-sulfophenyl-3-methyl-5-pyrazolone is obtained.

This new pyrazolone can easily be coupled in alkaline solution with various diazocompounds, yielding azo dyes, which dye wool from an acid bath in yellow shades, remarkable for the purity of their tints, their excellent equalizing properties and their nearly absolute fastness to light. Compared with the well known corresponding azo dyes of the 1.2'.5'-dichloro-4'-sulfophenyl-3-methyl-5-pyrazolone they dye slightly more greenish in shade, the dyeings being less sensitive to metals and metal salts especially copper and copper salts. They form in dry state yellow powders, dissolving in water and in strong sulfuric acid with greenish yellow coloration. Their neutral watery solution boiled with zinc dust is decolorized, the solution becoming pure blue-red on contact with the air.

In order to illustrate the new process the following example is given, the parts being by weight:

*Example.*

Add to a solution of 323 parts of 1.2'.5'-dichloro-3'-sulfophenyl-3-methyl-5-pyrazolone and 160 parts of calcinated sodium carbonate in about 1600 parts of water at a temperature not exceeding 10° C. the diazosulfonic acid obtained in the well known manner from 173 parts of orthoanilinesulfonic acid, care being taken that slightly alkaline reaction can be traced until the end. The diazo compound disappears in some minutes; the clear greenish yellow solution thus obtained is heated up to 75° C., acidulated with hydrochloric acid and the dyestuff is precipitated by addition of common salt; filtered off and dried it forms a greenish yellow powder, which dissolves easily in water with greenish yellow coloration. The new coloring matter dyes wool from an acid bath very level bright greenish-yellow shades of excellent fastness to light.

In a similar manner the various diazocompounds of other primary amines of the benzene and the naphthalene series can be used, as for instance aniline and its homologues and substitution products, their sulfonic acids, sulfamides and carboxylic acids and the betanaphthylaminemonosulfonic acids.

What I claim is:

1. The hereinbefore described process for the manufacture of yellow azo dyes by combining in an alkaline solution a diazo compound with 1.2'.5'-dichloro-3'-sulfophenyl-3-methyl-5-pyrazolone of the formula

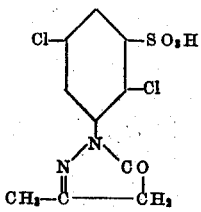

2. As new products of manufacture the azo dyes obtained as hereinbefore described by combining in an alkaline solution a diazo compound with 1.2′.5′-dichloro-3′-sulfophenyl-3-methyl-5-pyrazolone, being in dry state yellow powders, easily soluble in water and in strong sulfuric acid with yellow color, their neutral watery solution boiled with zinc dust being decolorized, the solution thereby obtained becoming in contact with the air pure blue-red.

In witness whereof I have hereunto signed my name this 20th day of January 1925, in the presence of two subscribing witnesses.

MELCHIOR BOENIGER.

Witnesses:
 ARMAND BEARNE,
 JOSEPH RIEKJEN.